(12) United States Patent
Tong

(10) Patent No.: US 8,339,958 B2
(45) Date of Patent: Dec. 25, 2012

(54) WIRELESS COMMUNICATION METHOD AND WIRELESS COMMUNICATION APPARATUS

(75) Inventor: Fangwei Tong, Yokohama (JP)

(73) Assignee: Kyocera Corporation, Kyoto (JP)

( * ) Notice: Subject to any disclaimer, the term of this patent is extended or adjusted under 35 U.S.C. 154(b) by 299 days.

(21) Appl. No.: 12/664,377

(22) PCT Filed: Jun. 4, 2008

(86) PCT No.: PCT/JP2008/060289
§ 371 (c)(1),
(2), (4) Date: Apr. 6, 2010

(87) PCT Pub. No.: WO2008/152959
PCT Pub. Date: Dec. 18, 2008

(65) Prior Publication Data
US 2010/0188999 A1   Jul. 29, 2010

(30) Foreign Application Priority Data
Jun. 13, 2007   (JP) ................. 2007-156321

(51) Int. Cl.
  *H04W 4/00* (2009.01)
(52) U.S. Cl. .............. 370/232; 370/329; 455/452.2
(58) Field of Classification Search .............. 370/229, 370/230, 230.1, 232, 328, 329, 340, 341, 370/468; 455/450, 452.1, 452.2
See application file for complete search history.

(56) References Cited

U.S. PATENT DOCUMENTS
2006/0121946 A1 * 6/2006 Walton et al. ................ 455/561
2006/0209767 A1 * 9/2006 Chae et al. .................... 370/335

FOREIGN PATENT DOCUMENTS
| JP | 09-215052 | 8/1997 |
| JP | 2006-287727 | 10/2006 |
| JP | 2007-096967 | 4/2007 |
| WO | WO-2007/001052 | 1/2007 |

OTHER PUBLICATIONS
International Search Report for PCT/JP2008/060289, mailed Sep. 16, 2008, 1 page.

* cited by examiner

*Primary Examiner* — Kerri Rose
(74) *Attorney, Agent, or Firm* — Duane Morris LLP

(57) ABSTRACT

A wireless communication method of a wireless communication apparatus (100) for performing wireless communication with a plurality of terminals based on the adaptive modulation scheme by using the space division multiple access scheme includes a data rate acquisition step of acquiring a data rate in a downlink to each terminal, a data rate estimation step of estimating a data rate in the downlink to each terminal based on the uplink signal quality of each terminal, a data rate difference calculation step of calculating, with respect to each terminal, a difference between the data rate estimated at the data rate estimation step and the data rate acquired at the data rate acquisition step and a channel assignment control step of controlling channel assignment to each terminal based on the difference in data rate calculated at the data rate difference calculation step.

6 Claims, 4 Drawing Sheets

FIG. 2

| | | | | | | Remarks |
|---|---|---|---|---|---|---|
| Channel No. | C10 | C20 | C30 | ... | C(N-1)0 | Basic channel |
| assignment order | 1 | 2 | 3 | ... | N-1 | |
| Channel No. | C11 | C21 | C31 | ... | C(N-1)1 | Spatial channel |
| assignment order | N+(N-1)L+1 | N+(N-2)L+1 | N+(N-3)L+1 | ... | N+L+1 | |
| Channel No. | C12 | C22 | C32 | ... | C(N-1)2 | Spatial channel |
| assignment order | N+(N-1)L+2 | N+(N-2)L+2 | N+(N-3)L+2 | ... | N+L+2 | |
| | | | . . . | | | |
| Channel No. | C1L | C2L | C3L | ... | C(N-1)L | Spatial channel |
| assignment order | N+NL | N+(N-1)L | N+(N-2)L | ... | N+2L | |

| | CN0 | |
|---|---|---|
| | N | |
| | CN1 | |
| | N+1 | |
| | CN2 | |
| | N+2 | |
| | | |
| | CNL | |
| | N+L | |

(a)

(b)

SORTING RESULT BASED ON DATA RATE DIFFERENCE    ADJUSTMENT RESULT BASED ON QoS

1 #2 #3 #4= GENERAL MOBILE STATIONS
A #B= IMPORTANT MOBILE STATIONS

WIRELESS COMMUNICATION METHOD AND WIRELESS COMMUNICATION APPARATUS

CROSS REFERENCE TO RELATED APPLICATION

This application is a U.S. National Phase of International Application No. PCT/JP2008/060289 filed Jun. 4, 2008 which claims priority to and the benefit of Japanese Patent Application No. 2007-156321, filed Jun. 13, 2007, the entire contents of which are incorporated herein by reference.

TECHNICAL FIELD

The present invention relates to a wireless communication method and a wireless communication apparatus.

BACKGROUND ART

The Space Division Multiple Access (SDMA) scheme achieves multiple access which can avoid mutual interference by separating users spatially based on the beam pattern formed by the adaptive array antenna (AAA) provided at the base station while allowing a plurality of users to share the same frequency and the same time slot. In order to appropriately form the beam pattern that avoids mutual interference according to the latest radio propagation condition of each terminal, this scheme uses reversibility of the propagation path of the communication system which employs the Time Division Duplex (TDD) scheme. In other words, the base station calculates the weight of AAA based on an uplink signal received from each terminal and corrects it if necessary, and then multiplies a downlink signal by this weight and transmits. Thus the weight multiplied to the downlink signal is calculated based on the uplink signal. Here, if the terminal moves at a high speed, when the base station transmits a downlink signal, the terminal may be away from the position where it had transmitted the uplink signal which the base station used to calculate the weight. In this case, the effect of preventing the interference by the beam pattern formed by the AAA fades and the received signal quality at each terminal deteriorates, resulting in decline in the throughput of the system.

In order to deal with the above mentioned problems, the conventional art suggests a channel assignment scheme in which the interference generated by movement of a terminal is avoided and the throughput characteristic is improved by assigning basic channels and spatial channels in order of moving speed of each terminal in consideration of the moving speed of each terminal (See Patent Document 1).

However, according to Patent Document 1, it is necessary to detect moving speed (that is, fading speed) of each terminal. Although some detection methods of moving speed have been suggested, most of them need to be further verified in terms of effectiveness, usefulness, accuracy or the like, and thus they are inconvenient. In addition, there is a method that uses highly effective and accurate GPS (Global Positioning System). However, the GPS is disadvantageous in that the cost is high and fading speed cannot be detected.

Further, even when channels are assigned in consideration of only terminal movement, for example, if a spatial channel is assigned to a high-priority terminal (e.g. a terminal performing VoIP: Voice over Internet Protocol) that requires QoS (Quality of Service), the terminal becomes more likely to be interfered by another spatial channel on the same frequency. Therefore, appropriate service cannot be provided even though its priority is high. It should be noted that, in this specification, "basic channel" refers to available carrier (frequency) and time slot and "spatial channel" refers to a channel which uses the same frequency and time slot as those of the basic channel but for which spatial multiplexing is performed based on the beam pattern of antenna formed by the AAA at the base station. Further, it should be noted that a basic channel can be a spatial channel when spatial multiplexing is performed, however, for convenience of explanation, such channel is also referred to as "basic channel".

Patent Document 1: Japanese Patent Application Laid-Open No. 9-215052

SUMMARY OF INVENTION

Technical Problems

It is an object of the present invention to provide a wireless communication method and a wireless communication apparatus that solve the above mentioned various problems, and with respect to a wireless communication method of a wireless communication apparatus (base station) for performing wireless communication with a plurality of terminals based on the adaptive modulation scheme by using the space division multiple access scheme, require no detection of moving speed of each terminal and improve the throughput in consideration of QoS of each terminal.

Solutions to Problems

To solve the above problems, in accordance with a first aspect of the present invention, there is provided a wireless communication method of a wireless communication apparatus (base station) for performing wireless communication with a plurality of terminals (mobile stations) based on an adaptive modulation scheme by using a space division multiple access scheme (and a frequency division multiple access scheme), includes:

a data rate estimation step of estimating a data rate in a downlink to each of the terminals based on uplink signal quality of each of the terminals;

a data rate acquisition step of acquiring (receiving) a data rate in the downlink to each of the terminals;

a data rate difference calculation step of calculating (by using a calculation unit such as CPU), with respect to each of the terminals, a difference between the data rate estimated at the data rate estimation step and the data rate acquired at the data rate acquisition step; and a channel assignment control step of controlling channel assignment to each of the terminals based on the difference in data rate calculated at the data rate difference calculation step.

The wireless communication method in accordance with a second aspect, wherein the data rate estimation step estimates the data rate in the downlink to each of the terminals based on the uplink signal quality of each of the terminals by using a correspondence between the uplink signal quality and the data rate in the downlink.

The wireless communication method in accordance with a third aspect, wherein (the data rate difference calculation step calculates the difference in data rate with respect to each of the plurality of terminals); and the assignment control step preferentially assigns channels which are not spatially divided (channels for frequency division multiple access scheme) to the plurality of terminals in descending order of the difference in data rate among the plurality of terminals.

The wireless communication method in accordance with a fourth aspect, wherein (the data rate difference calculation step calculates the difference in data rate with respect to each of the plurality of terminals); and the assignment control step preferentially assigns channels which are spatially divided to the plurality of terminals in ascending order of the difference in data rate among the plurality of terminals.

Further, the wireless communication method in accordance with a fifth aspect, further includes:

a QoS acquisition step of acquiring information (QoS attribute (VoIP, file transfer, video stream or the like) transmitted by each mobile station) on QoS (Quality of Service) of the plurality of terminals, wherein the assignment control step controls channel assignment to the plurality of terminals based on the difference in data rate calculated at the data rate difference calculation step and the QoS information acquired at the QoS acquisition step.

In the above description, the solutions to the problems of the present invention have been discussed as a method. However, it will be understood that the present invention can be implemented as an apparatus, a program and a recording medium on which a program is recorded and these are included in the scope of the present invention.

For example, in accordance with a sixth aspect, there is provided a wireless communication apparatus (base station), in which the present invention is implemented as an apparatus, for performing wireless communication with a plurality of terminals (mobile stations) based on an adaptive modulation scheme by using a space division multiple access scheme (and a frequency division multiple access scheme), includes:

a data rate estimation unit for estimating a data rate in a downlink to each of the terminals based on uplink signal quality of each of the terminals;

a data rate acquisition unit for acquiring a data rate in the downlink to each of the terminals;

a data rate difference calculation unit for calculating, with respect to each of the terminals, a difference between the data rate acquired by the data rate acquisition unit and the data rate estimated by the data rate estimation unit; and a channel assignment control unit for controlling channel assignment to each of the terminals based on the difference in data rate calculated by the data rate difference calculation unit.

Advantageous Effects on Invention

As described above, a wireless communication method capable of improving the throughput, guaranteeing QoS and being implemented easily at a low cost can be provided by appropriately assigning basic channels and spatial channels.

BRIEF DESCRIPTION OF DRAWINGS

FIG. 2 shows basic channels and spatial channels which are wireless channels used in the embodiment of the present invention along with the order of assignment;

DESCRIPTION OF THE PREFERRED EMBODIMENTS

Figure 1:
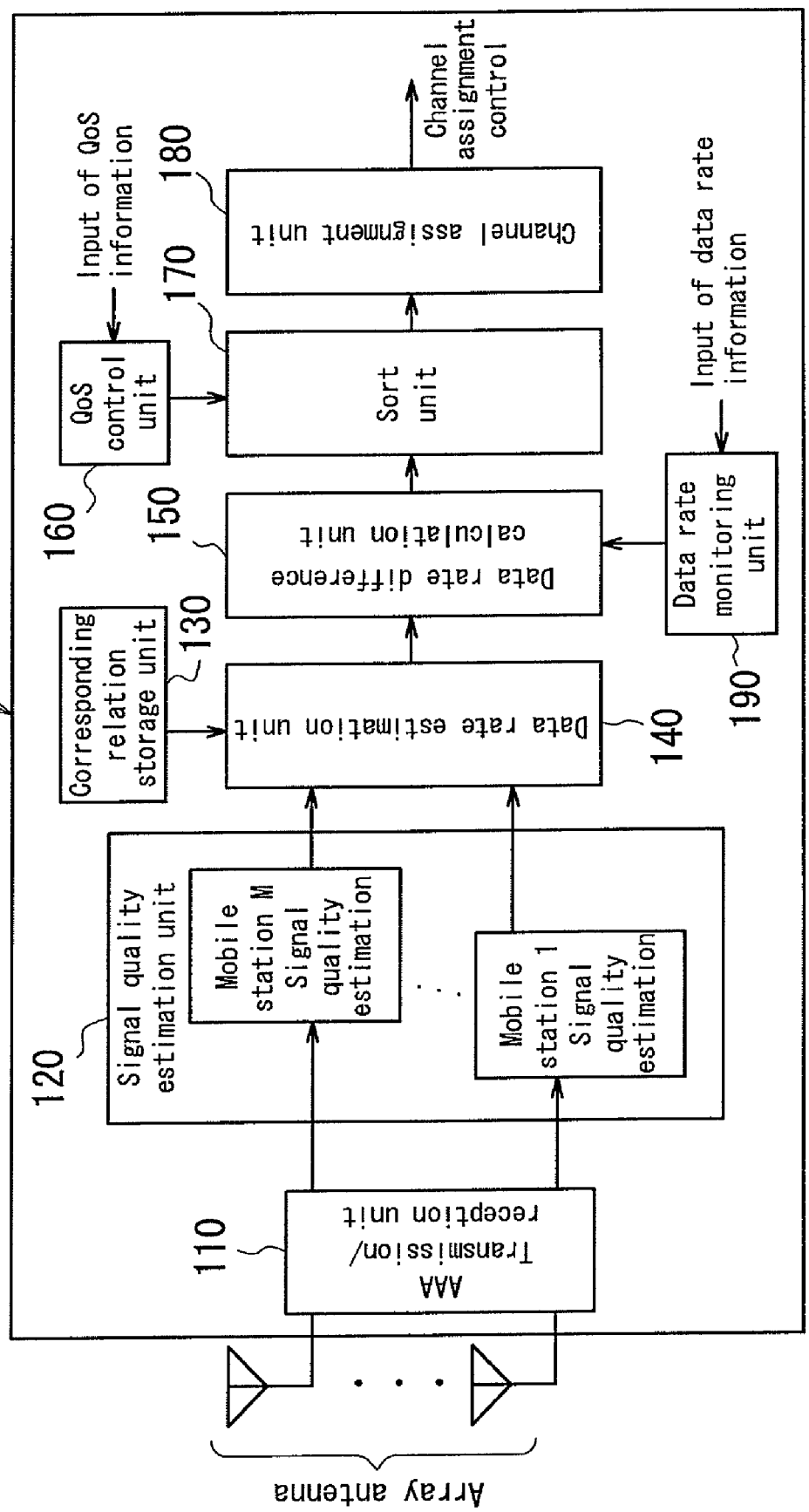
FIG. 1 is a block diagram of a wireless communication apparatus in accordance with an embodiment of the present invention.

The principle of the embodiment of the present invention will be described hereinafter followed by detailed description of the embodiment in accordance with the present invention. In the TDD scheme, the same frequency is used to the down (downlink: transmission from a base station to a terminal) and the up (uplink: transmission from the terminal to the base station). Thus reversibility is established at the transmission/reception channel when each terminal does not move. Therefore, the uplink received signal quality at the base station and the downlink received signal quality at the terminal have relation to each other, and thus the base station can estimate response characteristics of the downlink signal based on response characteristics of the uplink signal. Table 1 shows the relation of received signal quality between the downlink signal and the uplink signal when reversibility of the channel is established. As shown in Table 1, a definite relation is established between downlink received signal quality and uplink received signal quality. It should be noted that the table is provided as an example and the numerical values thereof are not exact.

TABLE 1

| Downlink recevied signal quality [dB] | Uplink received signal quality [dB] |
| --- | --- |
| 3.9 | −4.9 |
| 8.7 | −0.1 |
| 14.6 | 5.8 |

Moreover, in the wireless communication using the adaptive modulation scheme, the radio propagation environment (interference, fading and the like) is monitored and according to the condition, the modulation scheme (modulation class) for transmitting/receiving data is adaptively changed. For example, to the terminal moving at a low speed in an area close to a base station and in a good radio propagation environment (channel condition), data is transmitted by using the 64 QAM modulation scheme suitable for the case where the received signal strength is high. On the other hand, to the terminal that is away from the base station and in a poor channel condition or that is moving at a high speed, data is transmitted by using the BPSK modulation scheme suitable for the case where the received signal quality is low. Table 2 shows the relation among received signal quality, modulation scheme to be used for the quality and data rate that can be achieved with the modulation scheme. It should be noted that this table is also provided as an example.

TABLE 2

| Downlink recevied signal quality [dB] | Modulation scheme | Data rate [kbps] |
| --- | --- | --- |
| 3.9 | QPSK | 245 |
| 8.7 | 8PSK | 485 |
| 14.6 | 16QAM | 922 |

According to Tables 1 and 2, the relation shown in Table 3 is established between the uplink received signal quality and the data rate of downlink signal.

TABLE 3

| Uplink received signal quality [dB] | Quality of downlink signal [dB] | Modulation scheme | Data rate [kbps] |
| --- | --- | --- | --- |
| −4.9 | 3.9 | QPSK | 245 |
| −0.1 | 8.7 | 8PSK | 485 |
| 5.8 | 14.6 | 16QAM | 922 |

The base station estimates a condition of a channel used by a terminal based on the uplink received signal quality received from the terminal and based on Table 3, estimates a modulation scheme, that is, data rate, to be adopted when transmitting a downlink signal. However, in a case where the terminal is moving, the terminal is already away from the place where the terminal had transmitted the uplink signal which the base station used for estimation of modulation scheme, when the base station transmits the downlink signal. Therefore the terminal deviates from the direction of antenna beam formed by the AAA. In this case, since the performance of SDMA deteriorates, the modulation scheme of downlink shifts to a modulation scheme with small multi-values. In addition, a transmission error to the terminal occurs and subsequently a retransmission process is performed. Thus finally, the quality of downlink signal, that is, data rate, deteriorates. Table 4 shows an example of this phenomenon.

TABLE 4

| Uplink received signal quality [dB] | Downlink data rate estimated by base station [kbps] | Actual downlink data rate [kbps] | Difference between downlink data rates [kbps] |
| --- | --- | --- | --- |
| −4.9 | 245 | 106 | 139 |
| −0.1 | 485 | 245 | 240 |
| 5.8 | 922 | 485 | 437 |

As shown in Table 4, due to movement of the terminal or the like as described above, difference occurs between the downlink data rate estimated by the base station and the final downlink data rate. The present invention suggests a new channel assignment method by use of the phenomenon shown in Table 4, that is, the difference between the downlink data rate estimated by the base station and the final downlink data rate.

Embodiment of the wireless communication apparatus in accordance with the present invention will be described below in detail with reference to various drawings. As a wireless communication apparatus, a base station is used as an example. FIG. 1 is a block diagram of a wireless communication apparatus in accordance with the present invention. The wireless communication apparatus 100 has an array antenna, an adaptive array antenna AAA transmission/reception unit 110, a signal quality estimation unit 120, a corresponding relation storage unit 130, a data rate estimation unit 140, a data rate difference calculation unit 150, a QoS control unit 160, a sort unit 170, a channel assignment unit 180 and a data rate monitoring unit 190. The adaptive array antenna AAA transmission/reception unit 110 is known in the conventional art, and thus explanation is omitted.

The signal quality estimation unit 120 estimates the uplink received signal quality of each mobile station (terminal) (suppose that there are M mobile stations). Although there are many quality estimation methods, the quality is estimated based on the following equation by use of the known part of a received signal frame, for example.

$$SINR = \frac{\left[\frac{1}{N}\sum_{i=1}^{N} U(i)R^*(i)\right]^2}{\frac{1}{N}\sum_{k=1}^{N}\left[U(k)R^*(k) - \frac{1}{N}\sum_{i=1}^{N} U(i)R^*(i)\right]^2}$$ [Equation 1]

Here, SINR (Signal to Interference and Noise Ratio) is an indicator that indicates the received signal quality, U(i) (I=1, ..., N) is a known part of a received signal frame, R(i) (i=1, ..., N) is a reference signal and * is a complex conjugate. In addition, although there are some cases where the received signal quality is expressed as CNR (Carrier to Noise Ratio), in this case, SINR and CNR are not distinguished in particular, and are referred to as signal quality. Normally, SINR (or CNR) is expressed in dB. It should be noted that estimation for the uplink received signal quality is performed to all of the mobile stations being connected to the base station via wireless communication channels.

The corresponding relation storage unit 130 stores in advance the relation between the modulation scheme in downlink determined based on the uplink received signal quality and corresponding data rate as a table as shown in Table 3. The data rate estimation unit 140 estimates a data rate in a downlink to the mobile station based on the uplink received signal quality of a mobile station estimated by the signal quality estimation unit 120 and Table 3 stored in the corresponding relation storage unit 130. For example, based on Table 3, in the case where the uplink received signal quality of a mobile station is equal to or above −4.9 dB and less than −0.1 dB, the data rate estimation unit 140 estimates that a modulation scheme of a downlink signal to the mobile station is QPSK and that the data rate is 245 kbps. Such estimation of downlink modulation scheme and data rate is performed to all of the mobile stations being connected to the base station via wireless communication channels.

The data rate monitoring unit 190 acquires a data rate of actual downlink signal and outputs it to the data rate difference calculation unit 150. It should be noted that when the base station has information on the data rate of downlink signal in advance, the corresponding data rate may be output from the information to the data rate difference calculation unit 150. Here, the data rate monitoring unit 190 is provided because the information on the data rate of actual downlink signal to the data rate estimated by the base station is necessary. When there is no information on the data rate, the data rate can be calculated by the following equation.

Data rate=(the number of successfully transmitted bits)/(calculation period)

The "calculation period" of the above equation refers to the time range for calculating the data rate and is set to 0.1 to 0.2 seconds, for example. "The number of successfully transmitted bits" means the number of bits that are successfully transmitted during the calculation period, that is, the number of bits successfully received by the mobile station. It should be noted that the above calculation of data rate is not limited to using the number of bits, and can be performed using the number of frames.

The data rate difference calculation unit 150 calculates the difference between the data rate estimated by the data rate estimation unit 140 and the data rate of actual downlink signal to the corresponding mobile station input from the data rate monitoring unit 190 by the following equation.

Difference in data rate=(Estimated data rate)−(Actual data rate)

The above calculation is performed to all of the mobile stations being connected and may be stored in a storage unit (not shown) or the corresponding relation storage unit 130 in tabular form.

Large difference in data rate means that the radio propagation environment when a mobile station had transmitted an uplink signal which a base station used for estimation of the data rate of downlink signal changes due to movement of the mobile station or the like and the degree of change is large. Therefore, since a channel condition of a mobile station having a large difference in data rate may have deteriorated, more resistant channel should be adopted to such mobile station. In consideration of this, the result of difference in data rate calculated by the data rate difference calculation unit 150 is output to the sort unit 170, and the sort unit 170 arranges mobile stations in descending order of the difference in data rate. This arrangement order may be stored in the storage unit (not shown) in tabular form. For example, assuming that there are M mobile stations (#1, #2, ... #M) and calculated difference values in data rate are #1>#2, ... >#M, for convenience of explanation, the resulting arrangement would be #1, #2, ... #M, and thus a table is provided as shown in Table 5.

TABLE 5

| Priority | Identification No. of mobile station | Estimated data rate [kbps] | Acquired data rate [kbps] | Difference in data rate [kbps] |
|---|---|---|---|---|
| 1 | #1 | 245 | 145 | 100 |
| 2 | #2 | 922 | 842 | 80 |
| ... | ... | ... | ... | ... |
| M | #M | 485 | 475 | 10 |

If there is a plurality of mobile stations having the same difference in data rate, the data rates estimated by the base station or the actual data rates are compared among the mobile stations, and then the mobile stations are arranged in ascending order of data rate. If there are mobile stations having also the same data rate, these mobile stations may be arranged at random.

The QoS control unit 160 outputs the information on QoS (e.g. whether or not the data transmitted and received by the mobile station is any one of VoIP, video streaming, file transfer, Web browsing or others, and identification No. of each mobile station) acquired from a mobile station to the sort unit 170. Based on the QoS information input from the QoS control unit 160, the sort unit 170 adjusts the arrangement order so that priority is given to the important mobile station (e.g. a mobile station performing VoIP) that requires QoS. For example, the mobile stations are rearranged so that the important mobile station that requires QoS is placed on the top of the arrangement order among the mobile stations arranged based on the difference in data rate. If there is a plurality of important mobile stations, the important mobile stations are arranged in order of the difference in data rate and the mobile stations are rearranged so that all of the important mobile stations are placed on the top while keeping the order.

As an alternate rearrangement method, while monitoring the spatial multiplexing order and the communication speed of the important mobile station, first, the sort unit 170 adjusts the arrangement order so that the important mobile station moves up one place in the arrangement order and checks if the spatial multiplexing order of the mobile station decreases or the communication speed is improved. If they are improved, adjustment of the arrangement order is completed, and if not, the mobile station is further moved up one place in the arrangement order.

The channel assignment unit 180 assigns basic channels and spatial channels to mobile stations based on the arrangement result by the sort unit 170. The specific example is given below. FIG. 2 is a table showing basic channels and spatial channels that can be used for wireless communication along with channel Nos. and assignment order to each channel As shown in FIG. 2, assume that there are N basic channels (C10, C20, ... , CN0) and L spatial channels (C11, C12, ... , C1L) (spatially divided channels having the same frequency and time slot as C10) of the basic channel C10 (in this case, it is referred to as L+1 spatial multiplex), and in the same manner, assume that there are L spatial channels (C21, C22, ... , C2L) of the basic channel C20 and L spatial channels (C31, C32, ... , C3L) of the basic channel C30, and thus there are L spatial channels to each of N basic channels. In this case, as shown in the figure, basic channels are preferentially assigned to mobile stations, and if there is no basic channel to assign, spatial channels are assigned. In this case, it is assumed that the number of mobile stations M> the number of basic channels N. It should be noted that when M≦N, the number of basic channels is sufficient to the mobile stations, and thus assignment of the spatial channels to the mobile stations is not necessary.

The channel assignment unit 180 assigns basic channels and spatial channels in assignment order shown in FIG. 2 based on the arrangement order (for convenience of explanation, the arrangement order is assumed to be #1, ... , #M) of mobile stations made by the sort unit 170 and adjusted based on the QoS information from the QoS control unit 160. For example, channels are assigned to the mobile stations up to #M, respectively, so that the channel C10 (basic channel) of assignment order 1 is assigned to #1, which is placed on the top of priority order among the mobile stations of #1, ... #M, and the channel C20 of assignment order 2 is assigned to #2.

Figure 3:
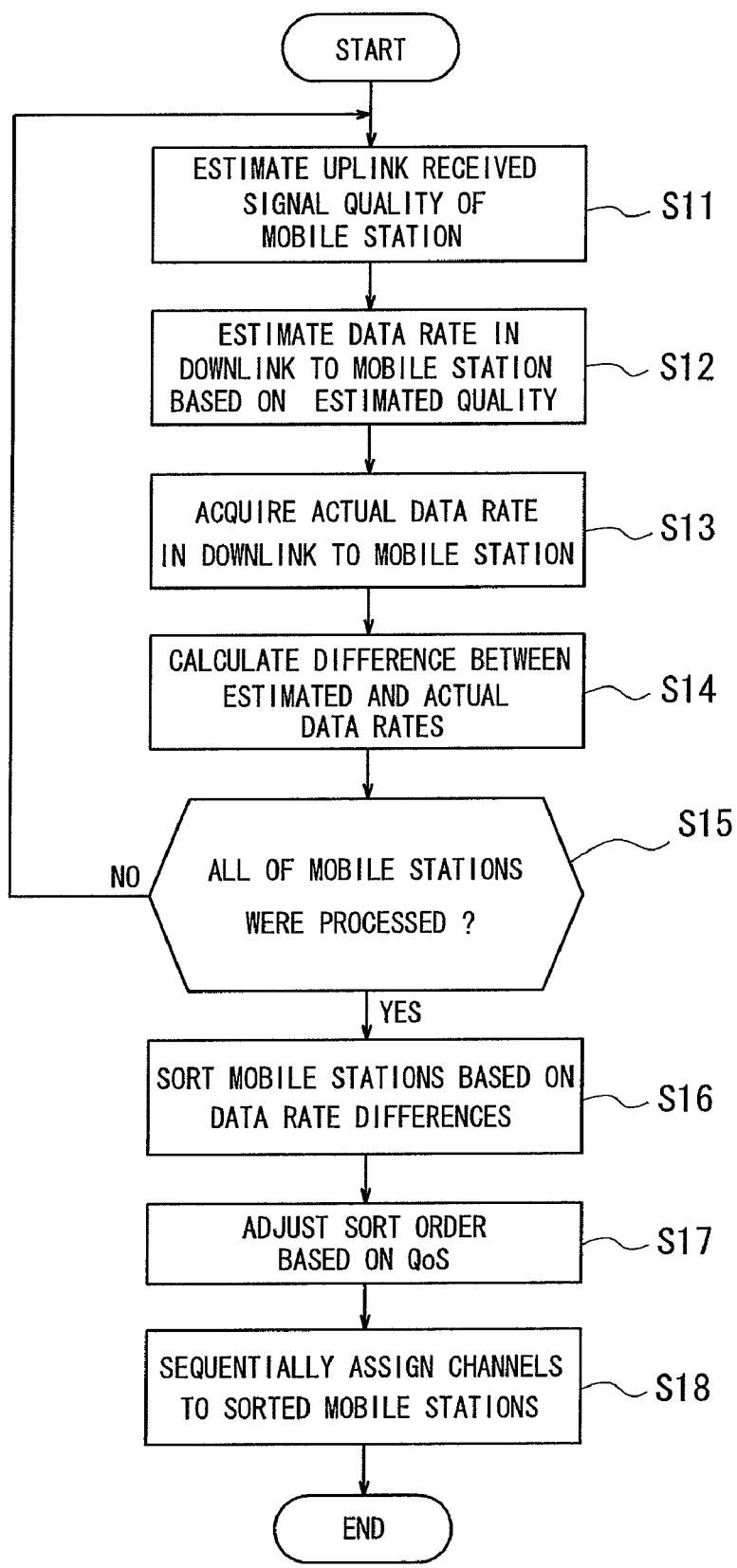
FIG. 3 is a flowchart of channel assignment processing of the wireless communication apparatus in accordance with an embodiment of the present invention.

The above channel assignment method will now be described with reference to a flowchart. FIG. 3 shows a flowchart of channel assignment control of the wireless communication method in accordance with the present invention. First, assume that each mobile station transmits a session initiation request to the wireless communication apparatus (base station) 100 (and the wireless access network including its control system) and when the session initiation is permitted, the session is initiated. The wireless communication apparatus 100 estimates the uplink received signal quality of each mobile station being connected based on the calculation of SINR described above or the like, for example (step S11). Secondly, based on the relation between the modulation class of downlink signal to be adopted according to the quality of uplink signal and corresponding data rate previously stored in tabular form, a data rate of downlink signal to each mobile station is estimated based on the estimated quality of uplink signal (step S12). After that, the data rate monitoring unit 190 acquires a data rate of actual downlink signal to each mobile station (step S13). Next, the data rate difference calculation unit 150 numerically calculates the difference between the data rate of downlink signal estimated by the data rate estimation unit 140 and the data rate of actual downlink signal to each mobile station input from the data rate monitoring unit 190 (by use of a calculation unit such as CPU) (step S14). Since the processes from S11 to S14 are performed to all of the mobile stations being connected, it is determined whether all of the mobile stations are processed or not (step S15).

Figure 4:
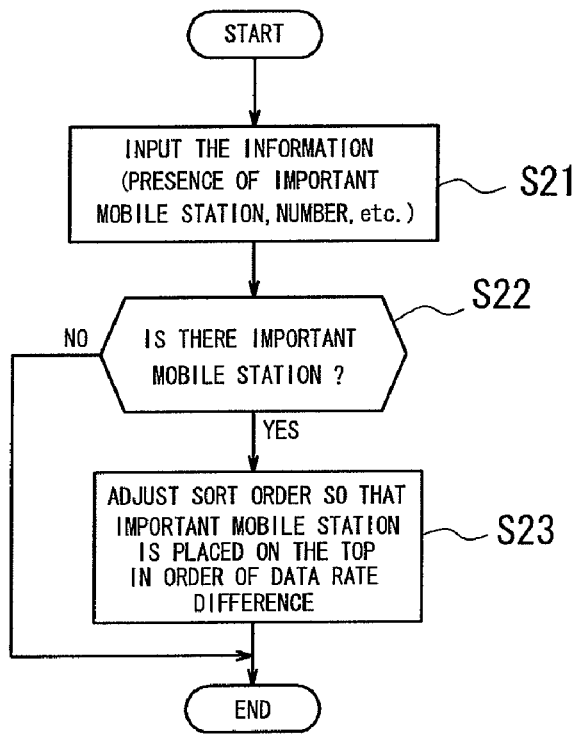
FIG. 4 is a flowchart of processing for adjusting the arrangement order of mobile stations based on QoS in the channel assignment processing of the wireless communication method in accordance with an embodiment of the present invention and an example of adjustment of the arrangement order.
Figure 4:
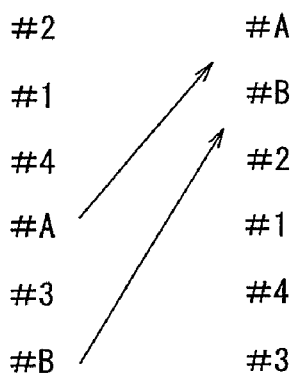

When calculation of the difference in data rate of all of the mobile stations is completed, the sort unit 170 arranges mobile stations in descending order of the difference in data rate based on the calculated differences in data rate (step S16). Next, the QoS control unit 160 acquires the QoS attribute of each mobile station and outputs it to the sort unit 170, and then based on the QoS attribute, the sort unit 170 performs process to adjust the arrangement order based on the difference in data rate (step S17). The process of adjustment is illustrated with reference to the flowchart of FIG. 4(a) and the adjustment example of mobile stations of FIG. 4(b). The sort unit 170 acquires the information on QoS attribute (identification No. or the like of important mobile station that requires QoS) from the QoS control unit 160 (step S21) and determines if there is any important mobile station (step S22). If there is an important mobile station, the arrangement order made at step S16 is adjusted so that the important mobile station is placed on the top (step S23). If there is a plurality of important mobile stations, the important mobile stations are placed on the top while the arrangement order based on the difference in data rate is kept. For example, in the example of FIG. 4(b), the arrangement order based on the difference in data rate is (#2, #1, #4, #A, #3, #B) in descending order of priorities, however, since the mobile stations #A and #B are important mobile stations that require QoS, the arrangement order is adjusted so that mobile stations are rearranged to (#A ,#B, #2, #1, #4, #3) while the arrangement order of (#A ,#B) is kept based on the difference in data rate between #A and #B. When there is no mobile station that requires QoS, the above mentioned process is not performed.

Explanation is continued with reference to the flowchart of FIG. 3 again. After that, at step S18, the channel assignment unit 180 assigns basic channels to mobile stations in descending order of priority based on the arrangement order by the sort unit 170. If all of the basic channels are occupied, spatial channels are sequentially assigned with reference to FIG. 2. The above described estimation of the quality of uplink signal, estimation of the data rate of downlink signal, calculation of difference in data rate, arrangement and assignment of channels are performed at a predetermined period. The predetermined period depends on the communication system and may be set to 1 to 2 seconds, for example.

Effect of the present invention is stated again. According to the present invention, in a method of wireless communication with a plurality of terminals based on the adaptive modulation scheme by using the space division multiple access, channel assignment control in consideration of the radio environment of the channel used by each terminal is possible. Thus the throughput can be improved. In addition, since a channel resistant to interference is preferentially assigned to a terminal that requires QoS, QoS can be guaranteed. Further, the present invention requires no detection of moving speed or fading speed of each terminal, and thus the method and apparatus in accordance with the present invention can be implemented at low cost and easily.

While the present invention has been described based on the various drawings and the embodiment, it should be noted that those skilled in the art can make various variations and modifications easily based on the present disclosure. Therefore it should be noted that these variations and modifications are included in the scope of the present invention. For example, functions or the like included in each function unit, each step or the like can be rearranged so as not to be logically inconsistent. Further, a plurality of units, steps or the like can be combined or divided.

The invention claimed is:

1. A wireless communication method of a wireless communication apparatus for performing wireless communication with a plurality of terminals based on an adaptive modulation scheme by using a space division multiple access scheme, comprising:
   a data rate estimation step of estimating a data rate in a downlink to each of the terminals based on uplink signal quality of each of the terminals;
   a data rate acquisition step of acquiring a data rate in the downlink to each of the terminals;
   a data rate difference calculation step of calculating, with respect to each of the terminals, a difference between the data rate estimated at the data rate estimation step and the data rate acquired at the data rate acquisition step; and
   a channel assignment control step of controlling channel assignment to each of the terminals based on the difference in data rate calculated at the data rate difference calculation step.

2. The wireless communication method according to claim 1, wherein the data rate estimation step estimates the data rate in the downlink to each of the terminals based on the uplink signal quality of each of the terminals by using a correspondence between the uplink signal quality and the data rate in the downlink.

3. The wireless communication method according to claim 1, wherein the assignment control step preferentially assigns channels which are not spatially divided to the plurality of terminals in descending order of the difference in data rate among the plurality of terminals.

4. The wireless communication method according to claim 1, wherein the assignment control step preferentially assigns channels which are spatially divided to the plurality of terminals in ascending order of the difference in data rate among the plurality of terminals.

5. The wireless communication method according to claim 1, further comprising:
   a QoS acquisition step of acquiring information on QoS of the plurality of terminals, wherein
   the assignment control step controls channel assignment to the plurality of terminals based on the difference in data rate calculated at the data rate difference calculation step and the QoS information acquired at the QoS acquisition step.

6. A wireless communication apparatus for performing wireless communication with a plurality of terminals based on an adaptive modulation scheme by using a space division multiple access scheme, comprising:
   a data rate estimation unit for estimating a data rate in a downlink to each of the terminals based on uplink signal quality of each of the terminals;
   a data rate acquisition unit for acquiring a data rate in the downlink to each of the terminals;
   a data rate difference calculation unit for calculating, with respect to each of the terminals, a difference between the data rate acquired by the data rate acquisition unit and the data rate estimated by the data rate estimation unit; and
   a channel assignment control unit for controlling channel assignment to each of the terminals based on the difference in data rate calculated by the data rate difference calculation unit.

* * * * *